US012640530B2

(12) United States Patent
De Cloet et al.

(10) Patent No.: US 12,640,530 B2
(45) Date of Patent: May 26, 2026

(54) METHOD FOR CRIMPING AN ELECTRICAL CABLE AND ELECTRICAL CABLE

(71) Applicant: TE Connectivity Germany GmbH, Bensheim (DE)

(72) Inventors: Olivier De Cloet, Bensheim (DE); Turgay Yilmaz, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 696 days.

(21) Appl. No.: 17/989,062

(22) Filed: Nov. 17, 2022

(65) Prior Publication Data

US 2023/0155338 A1 May 18, 2023

(30) Foreign Application Priority Data

Nov. 17, 2021 (DE) ......................... 102021129999.3

(51) Int. Cl.
*H01R 43/048* (2006.01)

(52) U.S. Cl.
CPC .................................. *H01R 43/048* (2013.01)

(58) Field of Classification Search
CPC .... H01R 43/048; H01R 9/0518; H01R 43/28; H01R 43/05; H01R 43/00; H01R 4/18; H01R 13/6592; H01R 13/6593; H01R 24/40
See application file for complete search history.

(56) References Cited

U.S. PATENT DOCUMENTS 5,468,911 A 11/1995 Leve et al.
6,205,653 B1 3/2001 Perez et al.
6,692,299 B1 * 2/2004 Stockmaster ........ H01R 9/0518 439/578
7,044,756 B1 * 5/2006 Asakura ............... H01R 13/648 439/607.41
8,602,797 B2 * 12/2013 Omae ................ H01R 13/6592 439/99

(Continued)

FOREIGN PATENT DOCUMENTS

CN 103296494 A 9/2013
CN 210806277 U 6/2020

(Continued)

OTHER PUBLICATIONS

Extended European Search Report dated Jun. 27, 2023, corresponding to Application No. 22207860.2-1201/4184727, 38 pages.

(Continued)

*Primary Examiner* — Thomas J Hong
*Assistant Examiner* — Jose K Abraham
(74) *Attorney, Agent, or Firm* — Barley Snyder

(57) ABSTRACT

A method for crimping an electrical cable with a shielding braid and an insulation enclosing the shielding braid includes removing the insulation at a predetermined area to expose an exposed portion of the shielding braid. The method includes crimping an inner crimp sleeve, comprising a pair of opposing crimp flanks, one of the crimp flanks has a locking latch and the other one of the crimp flanks has a latching receptacle, onto the insulation adjacent to the predetermined area and then bending back the exposed portion of the shielding braid at least sectionally over the inner crimp sleeve.

15 Claims, 4 Drawing Sheets

(56) References Cited

U.S. PATENT DOCUMENTS

| | | | | |
|---|---|---|---|---|
| 8,834,201 | B2 | 9/2014 | Miyawaki et al. | |
| 9,936,617 | B2 | 4/2018 | Degen et al. | |
| 10,008,784 | B2 * | 6/2018 | Kitagawa | H01B 7/0045 |
| 10,910,734 | B2 * | 2/2021 | Hamada | H01R 4/2495 |
| 10,923,834 | B1 | 2/2021 | De Cloet et al. | |
| 11,362,466 | B2 | 6/2022 | Droesbeke et al. | |
| 11,837,834 | B2 | 12/2023 | Hamada et al. | |
| 2013/0224997 | A1 | 8/2013 | Miyawaki et al. | |
| 2017/0201034 | A1 * | 7/2017 | Hikosaka | H01R 13/6473 |
| 2017/0214153 | A1 | 7/2017 | Hamada et al. | |
| 2017/0222349 | A1 | 8/2017 | Kleymann et al. | |
| 2017/0323706 | A1 | 11/2017 | Brueckner et al. | |
| 2018/0083404 | A1 * | 3/2018 | Höfling | H01R 43/05 |
| 2019/0086445 | A1 * | 3/2019 | Breithaupt | H01R 13/648 |
| 2019/0221329 | A1 * | 7/2019 | Miyamoto | H01R 9/0518 |
| 2020/0014129 | A1 * | 1/2020 | Hamada | H01R 4/2495 |
| 2020/0220313 | A1 | 7/2020 | Hofling | |
| 2020/0227842 | A1 | 7/2020 | Schrettlinger et al. | |
| 2021/0057853 | A1 | 2/2021 | Droesbeke et al. | |
| 2022/0069533 | A1 * | 3/2022 | Hamada | H01R 13/6592 |
| 2023/0129292 | A1 | 4/2023 | Mitsui et al. | |
| 2024/0313482 | A1 * | 9/2024 | Hamada | H01R 4/20 |

FOREIGN PATENT DOCUMENTS

| | | | | |
|---|---|---|---|---|
| CN | 112310664 | A | 2/2021 | |
| CN | 112490735 | A | 3/2021 | |
| CN | 113196589 | A | 7/2021 | |
| CN | 113206394 | A | 8/2021 | |
| EP | 3783741 | A1 | 2/2021 | |
| FR | 2747514 | A1 | 4/1996 | |
| JP | 2006109638 | A | 4/2006 | |
| JP | 2001309543 | A | 11/2011 | |
| JP | 2013182726 | A | 9/2013 | |
| JP | 2016181700 | A | 10/2016 | |
| JP | 2017228385 | A | 12/2017 | |
| JP | 2020092063 | A * | 6/2020 | |
| JP | 2020102365 | A | 7/2020 | |
| JP | 2021082430 | A | 5/2021 | |
| WO | WO-2018159351 | A1 * | 9/2018 | H01R 4/2495 |
| WO | 2020129623 | A1 | 6/2020 | |
| WO | 2021199945 | A1 | 10/2021 | |

OTHER PUBLICATIONS

German Office Action, Application No. 10 2021 129 999.3, Dated: Jul. 11, 2022, 7 pages.
Japanese Office Action dated Nov. 21, 2023 with English translation, corresponding to Application No. 2022-181576, 9 pages.
Korean Office Action dated May 5, 2024 with English translation, corresponding to Application No. 10-2022-0153584, 12 pages.
European Patent Office Examination Report dated Jun. 4, 2025, corresponding to Application No. 22 207 860.2-1201, 9 pages.
Chinese Office Action dated Sep. 13, 2025 with English translation, corresponding to Application No. 202211424338.0, 14 pages.

* cited by examiner

METHOD FOR CRIMPING AN ELECTRICAL CABLE AND ELECTRICAL CABLE

CROSS-REFERENCE TO RELATED APPLICATION

This application claims the benefit of the filing date under 35 U.S.C. § 119(a)-(d) of German Patent Application No. 102021129999.3, filed on Nov. 17, 2021.

FIELD OF THE INVENTION

The invention relates to a method for crimping an electrical cable and an electrical cable. Furthermore, the invention relates to a kit for crimping.

BACKGROUND

Electrical cables are used in numerous fields of technology to transmit energy or information between individual devices. Coaxial cables are a special type of electrical cable consisting of an inner conductor and a concentric outer conductor. The outer conductor usually consists of a shielding braid and serves to shield against interference fields. A dielectric is located between the inner conductor and the outer conductor. In addition to the shielding braid, the outer conductor can contain a shielding film to improve the shielding properties.

In order to connect the electrical cable to the electrical equipment, the electrical cable is usually provided with an electrical contact. The contact can be crimped to the cable. One possibility is to crimp an inner crimp sleeve (so-called support sleeve) onto a stripped area of the cable. However, the disadvantage here is that fixing the inner sleeve can lead to greater deformation of the shielding braid and thus also of the dielectric. Small variations in crimp height can therefore lead to changes in the impedance response of the cable and thus impair the quality of signal transmission. This can result in a high number of rejects. Due to the low tolerance in crimp height, it is also necessary to provide a specific crimp sleeve for each cable diameter, which increases storage and production costs. A cost-effective method for crimping an electrical cable is needed, by which the risk of faulty production is reduced and the signal transmission performance of the electrical cable is hardly or not at all impaired.

SUMMARY

A method for crimping an electrical cable with a shielding braid and an insulation enclosing the shielding braid includes removing the insulation at a predetermined area to expose an exposed portion of the shielding braid. The method includes crimping an inner crimp sleeve onto the insulation adjacent to the predetermined area and then bending back the exposed portion of the shielding braid at least sectionally over the inner crimp sleeve.

BRIEF DESCRIPTION OF THE DRAWINGS

The invention may be understood by reference to the following description taken in conjunction with the accompanying figures, in which.

DETAILED DESCRIPTION OF THE EMBODIMENT(S)

In the following, the invention is described in more detail by way of embodiments with reference to the attached Figures. In the Figures, elements which correspond to one another in terms of structure and/or function are provided with the same reference signs. The combinations of features shown and described in the individual embodiments are for explanatory purposes only. A feature of an embodiment can be omitted if its technical effect is not important for a particular application. Conversely, a further feature can be added to an embodiment if its technical effect should be advantageous or necessary for a particular application.

Figure 1:
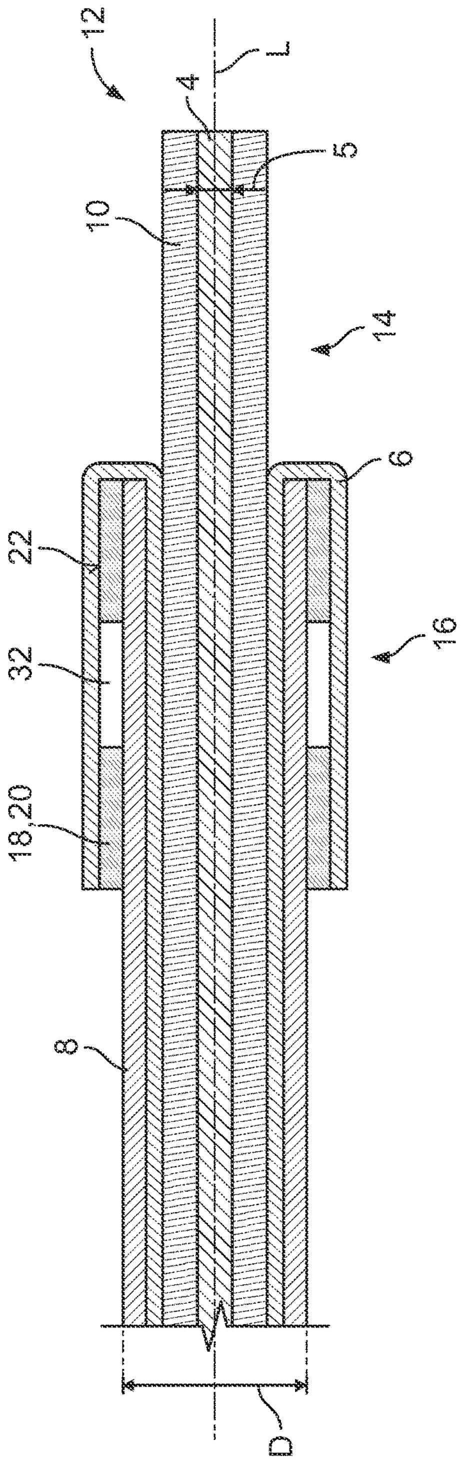
FIG. 1 is a schematic sectional view of an electrical cable according to an embodiment.

FIG. 1 shows a schematic sectional view of an exemplary configuration of an electrical cable 1. In particular, the electrical cable 1 may be an intermediate product 2 which can be further processed. The electrical cable 1 may extend along a longitudinal cable axis L and has a cable diameter D. The cable 1 has a central electrical conductor 4 having a conductor diameter 5, a shielding braid 6 enclosing the conductor 4, and an insulation 8 enclosing the shielding braid 6. In an embodiment, the inner conductor 4 can consist of several conductor wires.

A dielectric 10 can be arranged between conductor 4 and shielding braid 6. Optionally, a shielding film can also be provided between shielding braid 6 and dielectric 10.

At a free end 12 of the electrical cable 1, the electrical cable 1 may be stripped so that the shielding braid 6 is accessible from the outside at a predetermined area 14. At a section 16 adjoining the predetermined area 14 along the cable longitudinal axis L on the side facing away from the free end 12, an inner crimp sleeve 18 is crimped onto the insulation 8 as a support sleeve 20. The exposed shielding braid 6 is then bent back, at least sectionally, over the inner crimp sleeve 18 and covers the inner crimp sleeve 18.

In the present invention, the inner crimp sleeve 18 is no longer crimped directly onto the shielding braid 6, but onto the insulation 8. Because the inner crimp sleeve 18 is fixed to the insulation 8 by crimping, further processing of the electrical cable may be facilitated. For example, it may not be necessary to pay additional attention to the positioning of the inner crimp sleeve 18 when bending back the shielding braid 6. The insulation 8 acts as a buffer that resists deformation of the shielding braid 6 and/or the conductor 4 during crimping. Accordingly, crimping the inner crimp sleeve 18 onto the insulation 8 provides better impedance control and the electrical cable 1 has improved signal transmission performance. Fixing the inner crimp sleeve 18 to the insulation 8 makes it easier, in particular, to bend the shielding braid 6 back over the inner crimp sleeve 18, since slipping of the inner crimp sleeve 18 is avoided.

Furthermore, deviations in the cable diameter or in the inner crimp sleeve 18 can be compensated by the elasticity of the insulation 8 without affecting the impedance of the electrical cable 1. In an embodiment, the inner crimp sleeve 18 directly adjoins the predetermined area 14. This prevents a transition area in which the shielding braid 6 rests on the insulation 8 but not on the inner crimp sleeve 18.

Inner crimp sleeves 18 and also outer crimp sleeves can be used for a plurality of electrical cables 1 with different conductor 5 diameters. It is not necessary to use a crimp sleeve specific to each conductor diameter, which significantly reduces production and storage costs. For example, an inner crimp sleeve 18 intended for an electrical cable with a predetermined conductor diameter can now be used for an electrical cable 18 with a smaller conductor diameter, since the decisive cable diameter D for the inner crimp sleeve 18 is increased by the insulation 8.

If a stable fit of the inner crimp sleeve 18 is to be ensured, the inner crimp sleeve 18 can be seated for the most part on the insulation 8. A free end of the inner crimp sleeve 18 can project beyond the insulation 8 in the direction of the predetermined area 14. Consequently, the free end of the crimp sleeve 18 may overlap at least sectionally with the predetermined area 14. In an embodiment, the free end can protrude only minimally beyond the insulation 8. Thus, the portion of the inner crimp sleeve 18 overlapping with the predetermined area 14 may amount to at most 1/10 of the total length of the inner crimp sleeve 18. Alternatively, the end face of the inner crimp sleeve 18 can be flush with the insulation 8.

If the inner crimp sleeve 18 is to be prevented from protruding too far beyond the insulation 8, the section of the predetermined area 14 stripped before the inner crimp sleeve 18 is attached can be limited. For example, in particular before and after crimping the inner crimp sleeve 18, the electrical cable 1 can be stripped sectionally at the predetermined area 14.

The shielding braid 6 can substantially cover a shell surface 22 of the inner crimp sleeve 18 facing radially outward. In particular, the shielding braid 6 can completely cover the shell surface 22.

Now, with reference to FIGS. 2*a* to 2*d*, an exemplary configuration of a method for crimping the electrical cable 1 is described.

Figures 2A, 2B:
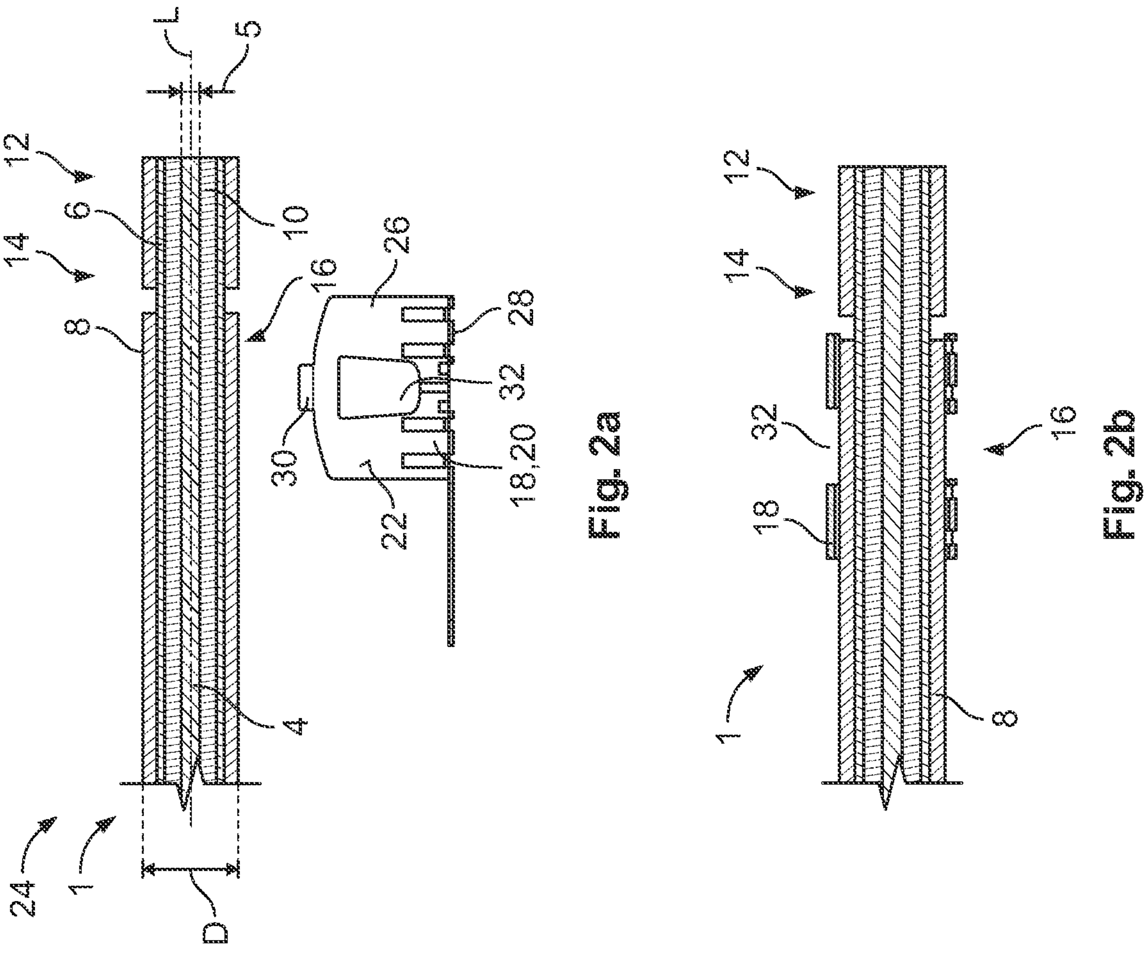
FIG. 2*a* is a schematic sectional view of an electrical cable before crimping.
FIG. 2*b* is a schematic sectional view of an electrical cable with an inner crimp sleeve crimped onto an insulation.

In FIG. 2*a*, the electrical cable 1 is shown in an initial state 24, i.e. the inner crimp sleeve 18 is not yet attached to the cable 1. Furthermore, the insulation 8 of the electrical cable 1 in the initial state 24 may still cover the shielding braid 6 in the predetermined area 14, at least sectionally. If it is intended to prevent an edge of the insulation 8 facing in the direction of the predetermined area 14 from projecting beyond an end face of the inner crimp sleeve 18 after the inner crimp sleeve 18 has been crimped, at least the section of the predetermined area 14 immediately adjacent to the insulation 8 can be stripped before the inner crimp sleeve 18 is placed on the insulation 8.

The inner crimp sleeve 18 can be fed to the electrical cable 1, in particular in a radial direction. Accordingly, the inner crimp sleeve 18 can be fitted with ease at any position of the electrical cable 1. The inner crimp sleeve 18 does not have to be pushed over the electrical cable 1 along the longitudinal axis of the cable 1. To allow radial feeding of the inner crimp sleeve 18, the inner crimp sleeve 18 may be configured as an open crimp sleeve. Thus, in a non-crimped state as shown in FIG. 2*a*, the inner crimp sleeve 18 has an open shape with two crimp flanks 26 which are connected to each other at one end via a common base 28 and whose free ends facing away from the base are spaced apart from each other. In particular, a distance between the free ends of the crimp flanks 26 may be greater than the cable diameter D.

The crimp flanks 26 may be provided at the free ends with complementary form-fit elements 30, for example a locking latch and a latching receptacle, which may be engaged with each other when crimped. The locking latch can serve to better catch the opposite crimp flank 26 during the crimping process to avoid a collision between the crimp flanks 26.

If the inner crimp sleeve 18 is now crimped around the insulation 8, the crimp flanks 26 perform a form fit and nestle against the insulation 8. In an embodiment, the overlap of the crimp flanks 26 can be individually adjusted and thus variations in the cable diameter D can be compensated for by determining the crimp height. As a result, higher tolerances are possible during production and the amount of rejects can be significantly reduced. Furthermore, identically constructed crimp sleeves 18 can be used for electrical cables 1 with a predetermined cable diameter D range.

A variation in the cable diameter D can be better compensated with the open crimp sleeve 18. Consequently, the permissible tolerance increases during crimping and the inner crimp sleeve 18 can be used for electrical cables 1 with different cable diameters D. For example, the variation in cable diameter D can be compensated for by overlapping the crimp flanks 18 in the crimped state.

Crimping the inner crimp sleeve 18 onto the insulation 8 can cause material displacement of the insulation 8. In order to reduce or even prevent a bulge-like accumulation of material in the longitudinal cable direction L in front of and behind the inner crimp sleeve 18, the inner crimp sleeve 18 can be penetrated along its shell surface 22 with at least one window 32. In an embodiment, each crimp flank 26 can have a respective window 32. This allows a more uniform distribution of the displaced material of the insulation 8.

In an embodiment, at least one of the crimp flanks 26 can have a lug as a form-fit element 30, which avoids a collision between the crimp flanks 26 during the crimping process and thus serves as a guide element for the other crimp flank 26. In the crimped state, the lug can engage in the window 32 of the other crimp flank 26 and thus align the crimp flanks 26 with each other if necessary.

Figure 2C:
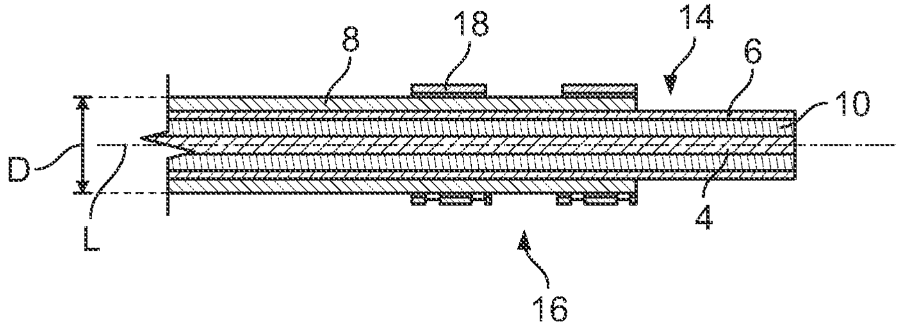
FIG. 2*c* is a schematic sectional view of the electrical cable of FIG. 2*b* with a stripped area.

After the crimp sleeve 18 is fixed to the insulation 8, as shown in FIG. 2*c*, the remaining insulation 8 can be removed at the section extending along the longitudinal cable axis L in the direction towards the free end 12 in the section adjoining the crimp sleeve 18. Thus, the shielding braid 6 is completely exposed at the predetermined area 14. Of course, the shielding braid 6 can also be completely exposed at the predetermined area 14 before the inner crimp sleeve 18 is crimped onto the insulation 8.

Figure 2D:
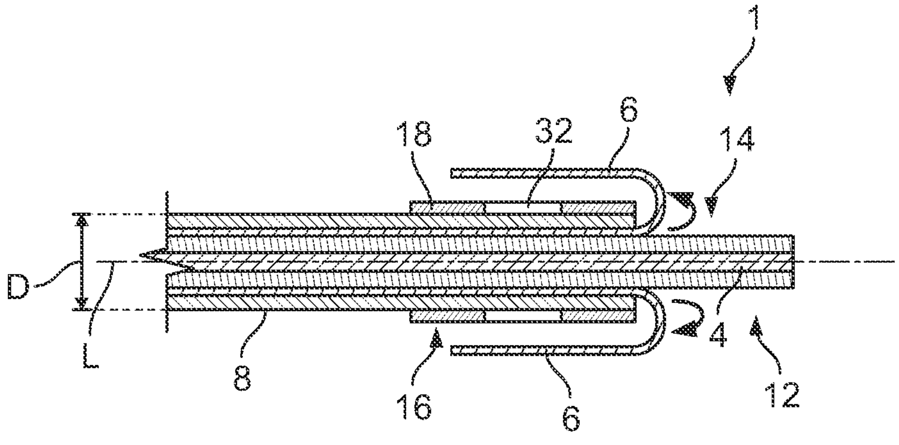
FIG. 2*d* is a schematic sectional view of the electrical cable of FIG. 2*c* with a shielding braid bent back over the inner crimp sleeve.

In an embodiment, the bent-back portion of the shielding braid 6 may not extend beyond the inner crimp sleeve 18 along a longitudinal direction L at an end of the crimp sleeve 18 remote from the predetermined region 14. The bent-back portion of the shielding braid 6 may be level with the opposite end of the crimp sleeve 18 such that the shielding braid 6 substantially completely covers the inner crimp sleeve 18. In FIG. 2*d*, it is shown that the exposed portion of the shielding braid 6 is bent back about 180° over the inner crimp sleeve 18 so that the shielding braid 6 covers the inner crimp sleeve 18 and the electrical cable 1 described with reference to FIG. 1 is obtained.

The method can in particular be an intermediate step for crimping an electrical cable 1. The electrical cable 1 is therefore an intermediate product that can be further processed by further method steps.

The conductor 4 can be exposed at the free end 12 and connected to a contact 34 (see FIG. 3*b*), for example a crimp contact. The contact 34 can be configured for a specific conductor diameter 5.

In an embodiment, an outer crimp sleeve 36 (see FIG. 3*b*) can be provided, which has a crimp section 38 with which the outer crimp sleeve 36 is crimped onto the inner crimp sleeve 18 at least sectionally. As a result, the portion of the shielding braid 6 that is bent back over the inner crimp sleeve 18 can be clamped between the inner crimp sleeve 18 and the outer crimp sleeve 38. Consequently, the outer crimp sleeve 36 can contact the shielding braid 6 and serve as a shield contact accordingly. The outer crimp sleeve 36 can have a crimping area that overlaps completely with the insulation 8 of the cable. Here, too, it is advantageous that the insulation 8 serves as a buffer and counteracts unwanted deformation of the shielding braid 6 and, in particular, of the dielectric.

The crimp section 38 can be divided into a wire crimp section 40 and an insulation crimp section 42. The wire crimp section 40 can, in particular, overlap completely along the longitudinal axis L with the inner crimp sleeve 18. The insulation crimp section 42 can be crimped directly around the insulation 8 on the side facing away from the free end 12 with respect to the inner crimp sleeve 18.

The method makes it possible to use both an inner crimp sleeve 18 and an outer crimp sleeve 36, which are provided for an electrical cable 1 with a larger conductor diameter 5, on the electrical cable 1 with a smaller conductor diameter 5.

Figure 3B:
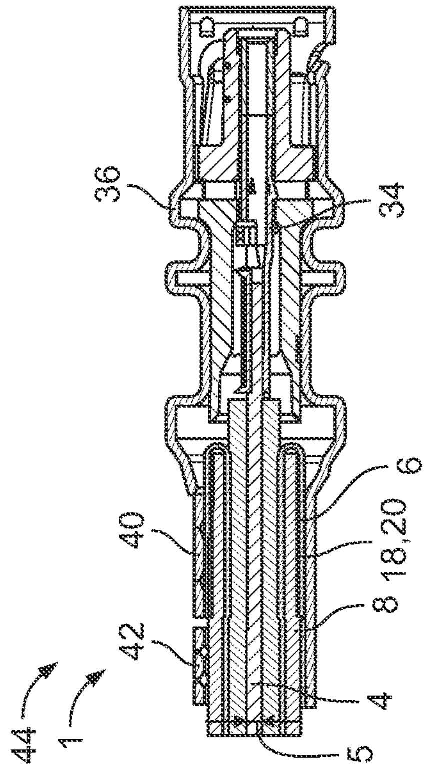
FIG. 3*b* is a schematic sectional view of an electrical cable from a kit with a smaller conductor diameter.
Figure 3A:
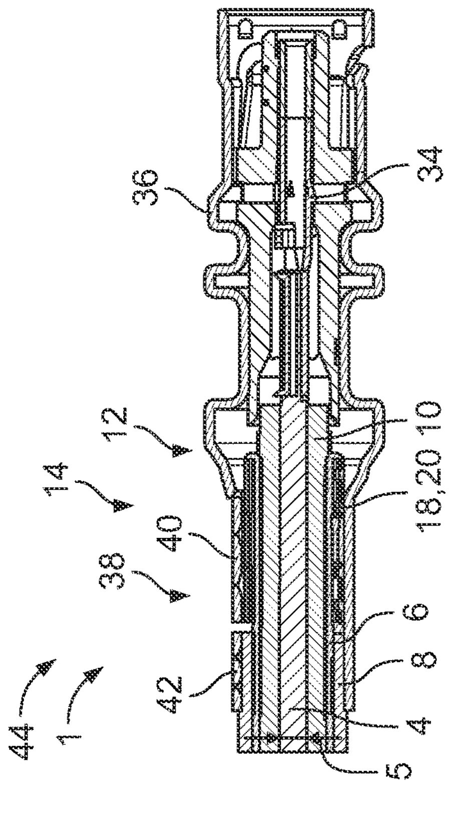
FIG. 3*a* is a schematic sectional view of an electrical cable from a kit having a larger conductor diameter.

This is reflected in a kit 44, which will now be explained in more detail with the aid of FIGS. 3*a* and 3*b*. The kit 44 comprises an electrical cable 1 with a larger conductor diameter 5 (FIG. 3*a*) and an electrical cable 1 with a smaller conductor diameter 5 (FIG. 3*b*). Typically, an inner crimp sleeve 18 and/or outer crimp sleeve 36 specifically configured for the cable diameter D is required for each electrical cable 1. Each electrical cable 1 of the at least two electrical cables in the kit 44 is respectively provided with a shielding braid 6 and an insulation 8 enclosing the shielding braid 6.

In the kit 44, at least two inner crimp sleeves 18 of identical construction are provided. One inner crimp sleeve 18 of the at least two inner crimp sleeves 18 may be crimped onto an area of the electrical cable 1 exposed from the insulation 8 in the electrical cable 1 with larger conductor diameter 5. The other inner crimp sleeve 18 of the at least two inner crimp sleeves 18 may be crimped onto the insulation 8 in the electrical cable 1 with smaller conductor diameter 5. Further, the kit 44 may include at least two identically constructed outer crimp sleeves 36, each crimped around the corresponding inner crimp sleeve 18.

The inner crimp sleeve 18 is seated for the most part or for the largest part on the insulation 8 if at least a length section of the inner crimp sleeve 18, the length of which corresponds to at least 50% of the total length of the inner crimp sleeve, is seated on the insulation 8. The same applies in the case where the inner crimp sleeve 18 is crimped onto the insulation 8 for the most part. The same also applies in the case that the crimp section 38 overlaps the insulation 8 for the most part.

What is claimed is:

1. A method for crimping an electrical cable with a shielding braid and an insulation enclosing the shielding braid, comprising:

removing the insulation at a predetermined area to expose an exposed portion of the shielding braid;

crimping an inner crimp sleeve onto the insulation adjacent to the predetermined area, the inner crimp sleeve has a pair of opposing crimp flanks in a non-deformed state prior to crimping, one of the crimp flanks has a locking latch and the other one of the crimp flanks has a latching receptacle;

bending back the exposed portion of the shielding braid at least sectionally over the inner crimp sleeve; and engaging, in a crimped state, the locking latch and the latching receptacle.

2. The method of claim 1, wherein the shielding braid is exposed at the predetermined area after crimping the inner crimp sleeve.

3. The method of claim 1, wherein the inner crimp sleeve is fed to the electrical cable in a radial direction perpendicular to a longitudinal direction of the electrical cable.

4. The method of claim 1, wherein the inner crimp sleeve is seated on the insulation.

5. The method of claim 1, wherein the shielding braid is clamped between an outer crimp sleeve and the inner crimp sleeve.

6. An electrical cable, comprising:

a shielding braid; and an insulation enclosing the shielding braid, the insulation is removed at a predetermined area and an exposed portion of the shielding braid is exposed; and an inner crimp sleeve crimped onto the insulation adjacent to the predetermined area, the inner crimp sleeve has a pair of opposing crimp flanks in a non-deformed state prior to crimping, one of the crimp flanks has a locking latch that, in a crimped state, engages a latching receptacle of the other one of the crimp flanks, the exposed portion of the shielding braid is bent back at least sectionally over the inner crimp sleeve.

7. The electrical cable of claim 6, wherein the inner crimp sleeve is open in a radial direction.

8. The electrical cable of claim 7, wherein the crimp flanks overlap at least sectionally in a crimped state.

9. The electrical cable of claim 6, wherein the inner crimp sleeve has a shell surface penetrated by a window of the inner crimp sleeve.

10. The electrical cable of claim 6, further comprising an outer crimp sleeve with a crimp section crimped onto the inner crimp sleeve.

11. The electrical cable of claim 10, wherein the crimp section at least mostly overlaps the insulation.

12. The electrical cable of claim 7, wherein at least one of the crimp flanks has a lug preventing the crimp flanks from colliding during crimping.

13. The electrical cable of claim 7, wherein one of the crimp flanks has a lug that aligns the crimp flanks with respect to each other in a crimped state.

14. The electrical cable of claim 13, wherein the lug engages a window of the other of the crimp flanks.

15. The electrical cable of claim 6, wherein the locking latch is provided at an end of the one crimp flank and the latching receptacle is provided at an end of the other one of the crimp flanks.

* * * * *